United States Patent [19]

Saine et al.

[11] 4,319,503
[45] Mar. 16, 1982

[54] TUBE FACING MACHINE

[75] Inventors: Thomas W. Saine, Placerville; John E. Pertle, Garden Valley, both of Calif.

[73] Assignee: Tri Tool Inc., Rancho Cordova, Calif.

[21] Appl. No.: 163,331

[22] Filed: Jun. 26, 1980

[51] Int. Cl.³ ............................................. B23B 5/16
[52] U.S. Cl. ..................................... 82/4 C; 408/104
[58] Field of Search .................. 82/4 C, 4 R; 408/104; 409/175

[56] References Cited

U.S. PATENT DOCUMENTS

| 3,228,268 | 1/1966 | Strout | 408/104 |
| 3,537,341 | 11/1970 | Zahuranec et al. | 82/4 C |
| 3,875,831 | 4/1975 | Beauloye | 82/4 C |
| 4,114,484 | 9/1978 | Feamster | 82/4 C |

Primary Examiner—Leonidas Vlachos
Attorney, Agent, or Firm—Bacon & Thomas

[57] ABSTRACT

A main body, including a tube holding portion, a tube end squaring and deburring portion and a tool bit actuating portion, is provided with a side handle which can be gripped for support and concurrently rotated to advance the tool bit into engagement with the tube end. A conventional electrical drill rotates the tool bit and a cam converts handle rotation to tool bit advance.

3 Claims, 4 Drawing Figures

TUBE FACING MACHINE

BACKGROUND OF THE INVENTION

Although the marketplace is replete with devices for cutting metal tubing, such is not the case, so far as known, with respect to machines especially suited to "facing" the tubing, i.e. removing the burs and rough edges produced by the cut-off tool and squaring the cut end of the tubing. It is believed that a lack of such machines is particularly felt in the area of metal tubing in the range of ¼ inch to 1 inch (0.635 cm to 2.54 cm) O.D. Based upon applicants' experience in the field of pipe face trimming and contouring it is their opinion that there is considerable room for improvement.

SUMMARY OF THE INVENTION

The invention relates generally to machines for facing metal tubing and, more particularly, to relatively small, portable and conveniently handheld devices capable of removing sharp burs and squaring the customary rough and angular edges resulting from the usual tubing cut-off tools.

The device is light in weight, can be driven by a ⅜ inch portable electric drill, for example, and yet produces workmanship of high quality.

It includes a work-holding portion at the front of the machine, however, the work piece faces toward the rear. The work piece cutting zone is intermediate the ends of the machine and the cutting area is visible through fenestrations in the encompassing walls. The after end of the device contains the tool bit actuating elements. All three of the major components join to form a small, compact and efficient tool.

BRIEF DESCRIPTION OF THE DRAWING FIGURES

Figure 2:
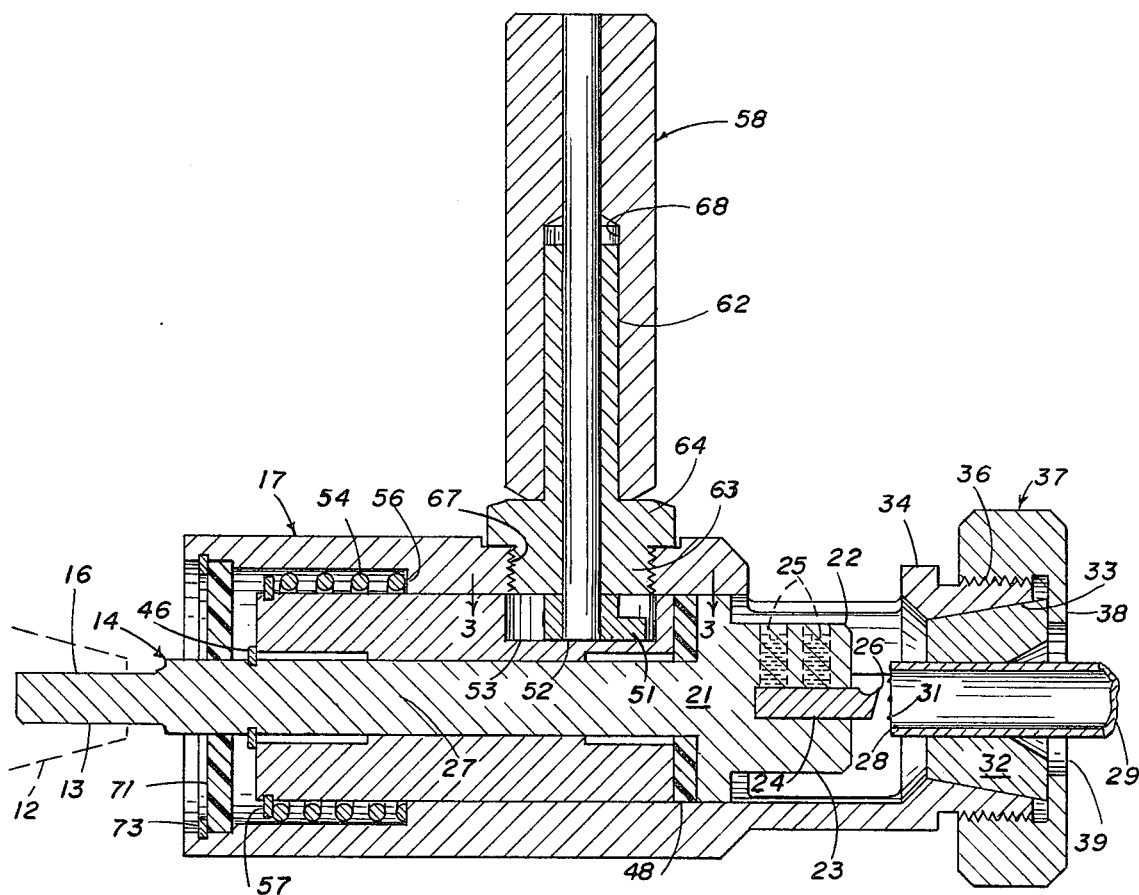
FIG. 2 is a median, longitudinal, sectional view with the handle in vertical position.
Figure 3:
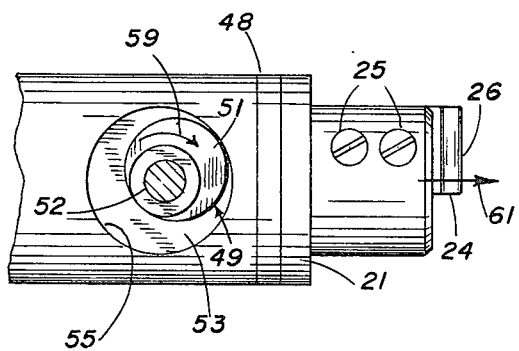
Figure 4:
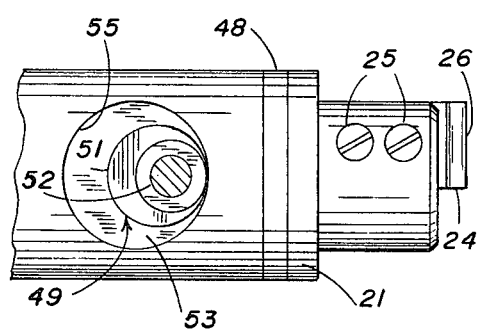

FIG. 3 is a fragmentary sectional view, to an enlarged scale, showing the cam in engagement with the wall of the cam recess and urging the sleeve toward the right in order to bring the cutter against the adjacent end of the tube, the plane of the section being indicated by the line 3—3 in FIG. 2; and, FIG. 4 is similar to FIG. 3 but with the cam shown in base position and the sleeve retracted into extreme left-hand location.

DETAILED DESCRIPTION OF PREFERRED EMBODIMENT

It is frequently desirable, and often necessary, when using tubing to have the tube end "faced", i.e. free from burs and rough edges and precisely at right angles to the tube axis.

More often than not, however, tube cutting machines tend to leave burs, sharp projections and other irregularities, particularly where the tube material is metal, such as copper, brass, aluminum and steel.

The tube facing machine disclosed herein, provides a compact, convenient, portable, economical and safe solution to the problem. It lends itself to use in small shops as well as large ones, and while the device is susceptible of numerous different embodiments, depending upon the environment and requirements of use, the particular embodiment shown in the accompanying drawings and described in the following description has been made, tested and used and has performed in eminently satisfactory manner.

The tube facing machine of the invention, generally designated by the reference numeral 11, is conveniently powered by a conventional ⅜" electric hand drill, such as is found in most home shops as well as in factories and other businesses.

The chuck 12 of such a hand drill is illustrated in FIG. 2 as gripping the stem end 13 of a shaft 14. A plurality of flats 16 on the stem end improves the operation of the chuck.

The shaft 14 is rotatable relative to a main body 17, or frame, of hollow, generally right circular cylindrical configuration.

The end of the shaft 14 opposite the drill chuck end is enlarged to form a head 21 including a pair of opposed jaws 22 and 23 receptive to a cutter 24, or bit, of tool steel. A pair of set screws 25 secures the bit.

The cutting edge 26 of the tool bit 24 is precisely at right angles to the axis of rotation 27 of the shaft 14 so that when the bit 24 is urged against the adjacent end 28 of tube 29, the burs 31 are removed and the end faced at right angles, as desired.

The tube 29 is firmly gripped and held in co-axial alignment with the shaft axis 27 by a suitable set of tapered collets 32 congruent to the inner, leftwardly converging walls 33 (see FIG. 2) of a ring 34 having exterior threads 36 engaging with the conjunctive interior threads of a cap 37. The ring 34 is located on the forward end of the main frame 17, or body.

The head 38 of the cap 37 bears against the adjacent outer surface of the collet 32 as the cap is tightened, and as the collet elements are urged toward the left, as in FIG. 2, the walls 33 wedge the collet into clamping relation with respect to the tube 29. A central aperture 39 in the head 38 of the cap 37 accommodates the tube 29.

Conveniently, collet sets are made in several different sizes so that tubes from ¼ inch to 1 inch or more, can be worked on, it being merely necessary to unscrew the cap, insert a selected set of collets and screw on the cap to prepare the device for the tube size to be faced. Collets could be made, for example, in size steps of ⅛ inch up to ½ inch and ¼ inch from ½ to 1 inch.

The ring 34 on the forward end of the main, cylindrical body 17 extends rearwardly toward the hand-grip portion of the body. However, the rearward extension 41 of the ring 34 is interrupted by a plurality (here, three) of openings 42, or windows, through which can be observed the operation of the cutter 24 as it translates toward and faces the tube end 28.

The shaft 14 is journaled in a hollow cylindrical sleeve 44 which, in turn, is slidably disposed within the main cylindrical body 17 for fore and aft movement within limits.

The sleeve 44 and the shaft 14, in fact, translate to and fro in unison owing to the provision of a snap ring 46 lodged within a transverse annular recess in the shaft 14 and projecting radially outwardly to cover a portion of the after end 47 of the sleeve 44.

The snap ring 46 offers no significant resistance to the relative rotational movement of the shaft 14 and the sleeve 44 but it compels the leftward translation of the shaft 14 when the sleeve 44 moves toward the left.

When the sleeve 44 is urged toward the right, a thrust washer 48 of low friction material (DELRIN, for instance) transmits the force to the enlarged head 21 of the shaft 14.

Thus, both the sleeve 44 and the shaft 14 move as one in translation while the shaft 14 can freely rotate relative to the sleeve 44.

In order to move the sleeve 44, and the rotatable shaft 14, between a base position in which the cutter 24 is spaced from the tube end 28 and a facing position in which the cutter engages the tube end, there is provided a cam 49 in which a cam lobe 51 is eccentrically mounted on the inner end of a rod 52.

Figure 1:
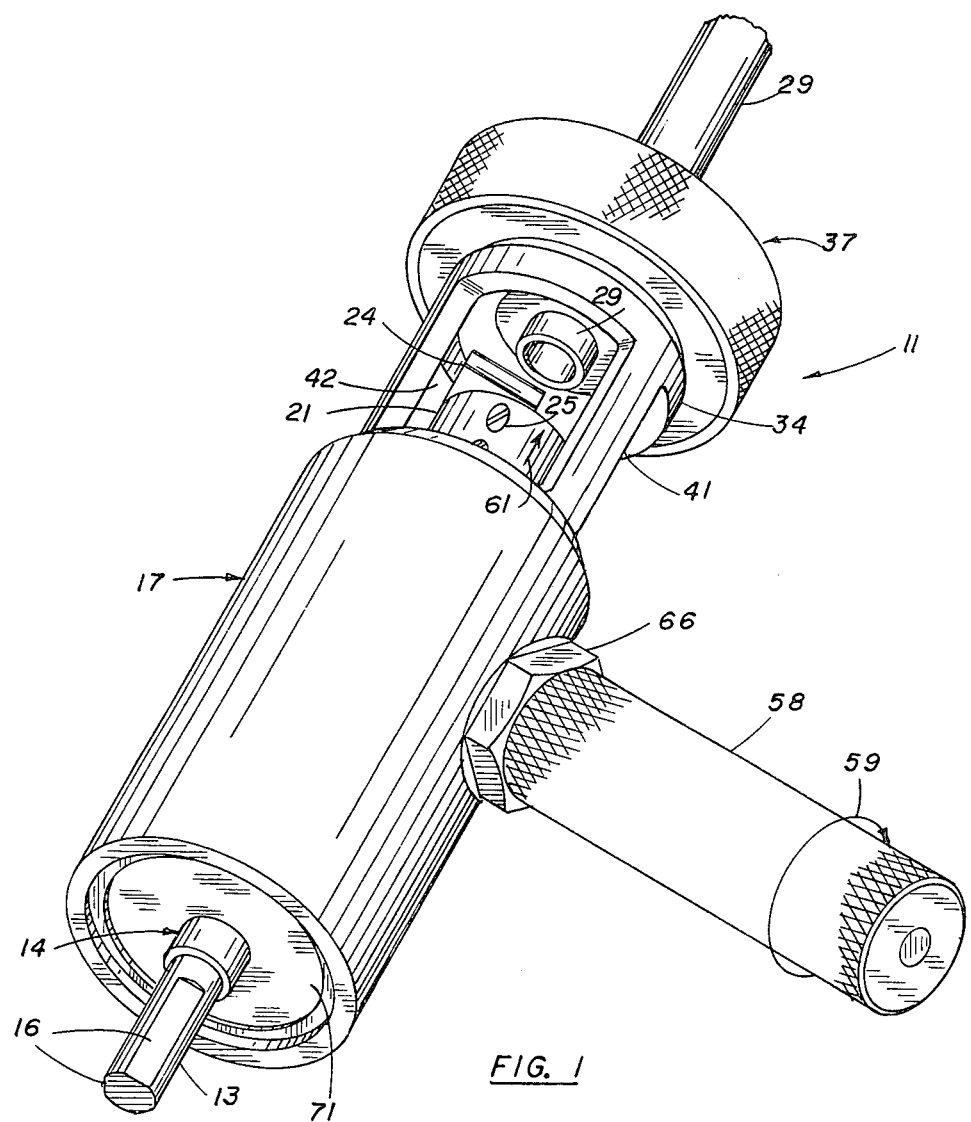
FIG. 1 is a top rear perspective view showing a piece of cut metal tubing positioned in the collets with the rough face located adjacent the cutter preparatory to moving the cutter into the tube facing engagement by rotating the cutter-positioning handle in a clockwise direction, as shown.

By rotating the rod 52 clockwise (as seen in FIGS. 1 and 3) about its own axis of rotation, the cam lobe 51 is swung from a first extreme, or base position shown in FIG. 4, in which the lobe 51 faces rearwardly, or toward the left, through a partially displaced position, as appears in FIGS. 2 and 3, toward a second extreme position in which the lobe 51 faces forwardly, or toward the right.

Preferably, shortly before reaching the second extreme position, the cutter 24 will have engaged the tube end 28 and the tube facing operation commenced.

Rotation of the cam 49 causes the off-center cam lobe 51 to engage the surrounding upstanding walls of a circular recess 53 in the top of the sleeve 44.

In base position of the cam 49 (FIG. 4) the sleeve 44, and shaft 14, are in extreme left or rearward position, as explained above, being urged in that direction by a helical spring 54 at one end abutting a shoulder 56 in the main body 17 and at the other end exerting a leftward urgency against the projecting portion of a snap ring 57 lodged in an annular recess adjacent the after end 47 of the sleeve 44.

Thus, when the handle 58 secured to the rod 52 is rotated in a clockwise direction, as indicated by the arrow 59 (see FIGS. 1 and 3), the urgency of the spring 54 is overcome as the cam lobe 51 engages the walls 55 of the recess 53 and forces the sleeve 44 (and shaft 14) toward the forward, or rightward, direction shown by the linear arrow 61 in FIGS. 1 and 3.

The handle 58 is knurled to facilitate gripping and rotating, as is the cap 37.

The rod 52 is journaled in a fixed hollow post 62 provided with a threaded base 63 surmounted by a cap 64 having wrench flats 66 to facilitate screwing the base 63 into a tapped hole 67 in the body 17 adjacent the recess 53 in the sleeve 44 (see FIG. 2). The post 62 projects into a drilled bore 68 in the side handle 58; and the side handle 58 (together with the rod 52 and the cam 49) are rotatable relative to the fixed post 62.

An end plate 71 is held in place by a shoulder and a snap ring 73 (see FIG. 2) in the main body 17 to keep out dust and moisture.

OPERATION

Select the proper size collet set for the tubing to be deburred and squared. Insert collet set into the tapered opening and screw on knurled cap part way. Insert the tube in the collet, making sure that the tube extends about ⅜ inch inwardly from the rear end of the collet. Tighten the knurled cap to close the collet. Attach the drill motor to the shaft, preferably a ⅜ inch variable speed drill. Hold the drill motor and the side handle. Start the motor and turn the handle slowly in a direction to advance the cutter toward the tube end until the required amount of material is removed. After facing the tube end, release the force on the side handle to retract the cutter. Stop the motor. Unscrew the cap and remove the deburred and squared tube.

We claim:
1. Tube facing machine comprising:
   a. an elongated, hollow, generally cylindrical body extending from an after end to a forward end, said body including a tube holding portion adjacent said forward end, a tube facing portion aft of said tube holding portion, and a facing cutter actuating portion;
   b. collet means in said tube holding portion for positioning the end of a tube to be faced at a predetermined location within said tube facing portion of said body;
   c. a drive shaft rotatably mounted within said facing cutter actuating portion, said shaft including means for mounting a facing cutter in the vicinity of the end of the tube to be faced;
   d. means for rotating said drive shaft;
   e. means for urging said drive shaft toward said forward end in order to urge the cutter into tube facing engagement with the adjacent end of the tube;
   f. a sleeve slidably disposed in said facing cutter actuating portion of said body for movement in a longitudinal direction;
   g. means for journaling said drive shaft in said sleeve;
   h. means for translating said sleeve and said drive shaft in unison; and
   i. wherein said drive shaft urging means includes a cam having a cam shaft rotatably mounted on said body and a cam face in engagement with said sleeve in order to translate said sleeve and said shaft as said cam shaft is rotated.

2. A tube facing machine as in claim 1 further including a handle mounted on said cam shaft, rotation of said handle being effective to rotate said cam and advance said sleeve and said drive shaft in unison toward said forward end of said body for engagement of the facing cutter with the adjacent end of the tube to be faced.

3. A tube facing mechanism as in claim 2 including spring means for urging said sleeve toward said after end of said body, said drive shaft translating in unison with said sleeve to move the facing cutter away from the tube being faced as said cam shaft handle is released.

* * * * *